United States Patent [19]

Smith

[11] 4,309,106
[45] Jan. 5, 1982

[54] BEAM POSITION LOCATER WITH PHOTODETECTOR ARRAY

[75] Inventor: Kenneth L. Smith, Dayton, Ohio

[73] Assignee: The United States of America as represented by the Secretary of the Air Force, Washington, D.C.

[21] Appl. No.: 118,007

[22] Filed: Feb. 4, 1980

[51] Int. Cl.³ .......................... G01J 1/44; G01J 11/14
[52] U.S. Cl. .................................. 356/121; 250/561; 356/375
[58] Field of Search ............................... 356/121–122, 356/375; 250/209, 561, 578, 211 J; 358/213, 241

[56] References Cited

U.S. PATENT DOCUMENTS

| 3,555,180 | 1/1971 | Cook | 250/211 J |
| 3,973,119 | 8/1976 | Renes et al. | 250/209 |
| 4,221,973 | 9/1980 | Nosler | 250/561 |

OTHER PUBLICATIONS

Weckler G. D., "Solid-State Image Sensors in Electro-Optical Systems", Electro-Optics/Laser International '76 UK, Brighten, Sussex, England, Mar. 9–11 1976, pp. 194–199.

Weimer et al., "Self-Scanned Image Sensors Based on Charge Transfer by The Bucket-Brigade Method", IEEE Trans. on Electron Devices, 11-1971, pp. 996–1003.

Primary Examiner—William H. Punter
Attorney, Agent, or Firm—Donald J. Singer; Casimer K. Salys

[57] ABSTRACT

An apparatus for accurately detecting and digitally displaying the centrum of the location where a luminous energy beam impinges a shift register scanned linear photodetector array. With the commencement of the array scan, clock pulses corresponding to successive photodiodes are accumulated in a counter, continuing until an illuminate photodiode, with a video response above the detection threshold, is encountered. Thereafter, clock pulses are locked out while only alternate video pulses reach the counter. The onset of the succeeding scan locks out the video pulses, leaving the counter display at the previously accumulated count for an extended period defined by a supplemental sample timing circuit. The sampling of scans provides a display sufficiently stable for visual monitoring.

6 Claims, 10 Drawing Figures

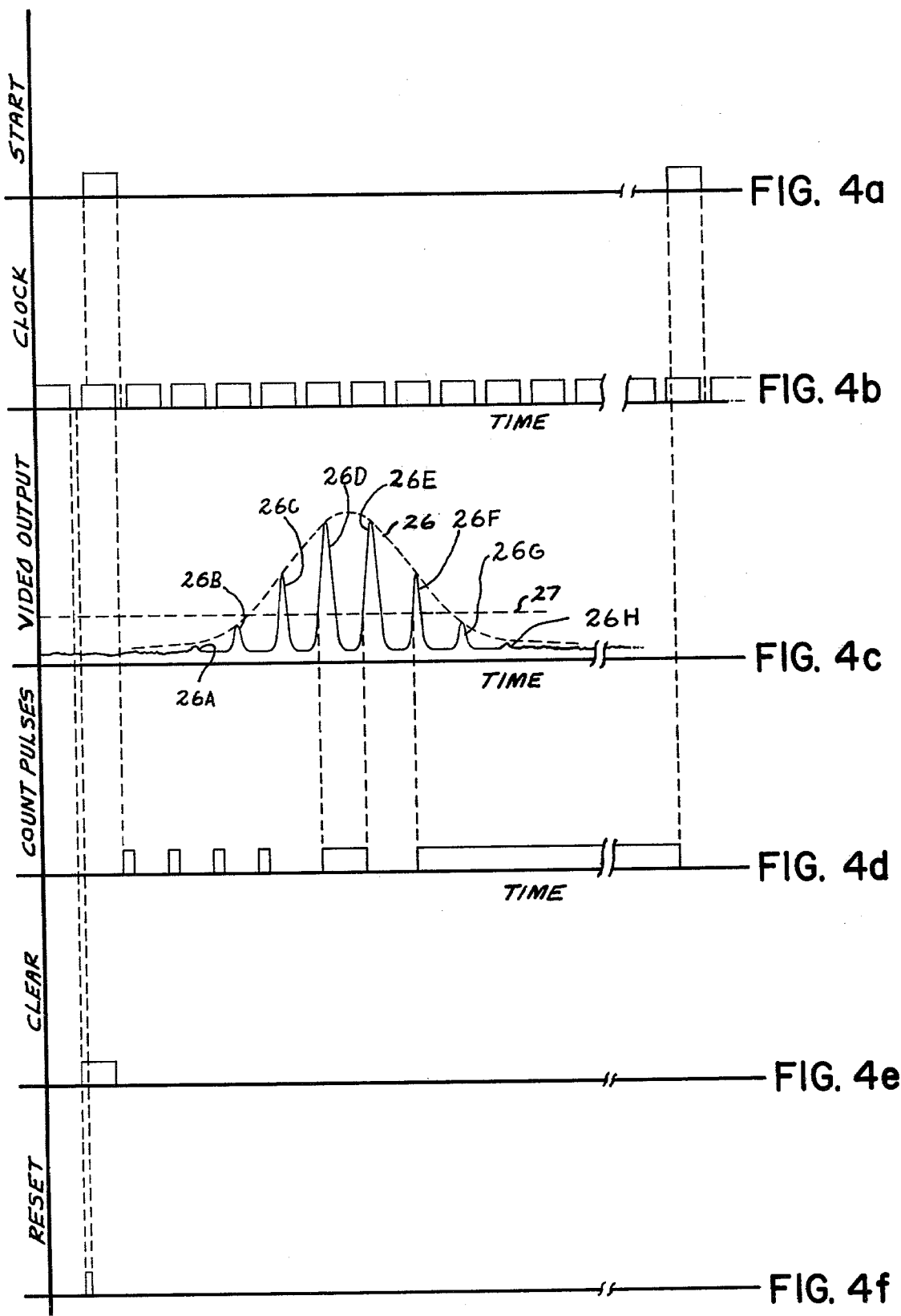

BEAM POSITION LOCATER WITH PHOTODETECTOR ARRAY

RIGHTS OF THE GOVERNMENT

The invention described herein may be manufactured and used by or for the Government of the United States for all governmental purposes without the payment of any royalty.

BRIEF SUMMARY

The invention is directed to an electronic apparatus for locating the centrum of a spread luminous energy beam impinging a shift register scanned linear photodetector array. The clock pulses corresponding to successive detectors, in the course of scanning the array from one end to the other, are accumulated in a counter until a video signal indicates an illuminated detector. Thereafter, alternate processed video signals are counted, while clock pulses are locked out. At the end of that scan, all subsequent clock and video pulses are prohibited from reaching the counter.

Allowing the apparatus to cycle freely, at the comparatively high scanning rate typical of the art, produces visual offensive flicker in the display. To overcome this detraction, the counter accumulation and associated visual display presents the count from a sampled scan, in which the sampling rate is within the perceptive frequency range of human vision.

Inoperability of the video signal is detected by an alternating visual display, sequentially alternated by the scan start and then the first video pulses.

DESCRIPTION OF THE DRAWINGS

FIGS. 4a–4f contain time plots of the various electrical signals.

DETAILED DESCRIPTION

Linear photodiode arrays find applications in optical character recognition, pattern recognition, facsimile and non-contact measurements. Often the luminous energy impinging the linear array elements is significantly broader than any one element, while the functional objective of the apparatus seeks to find the centrum of the spread.

The difficulty of locating this centrum is exacerbated by the fact that the conventional output from linear arrays consists of data synchronized to an internal shift register scanning circuit. Undoubtedly, photodiode arrays having direct access to each diode element are available. Nevertheless, a normal array user would not likely choose this route when made aware of the attendant packaging problems. Namely, a device package having hundreds of pins. In conclusion, then, a shift register pulse train output typifies the form of the detection data obtained from a photodiode linear array.

Figure 1:
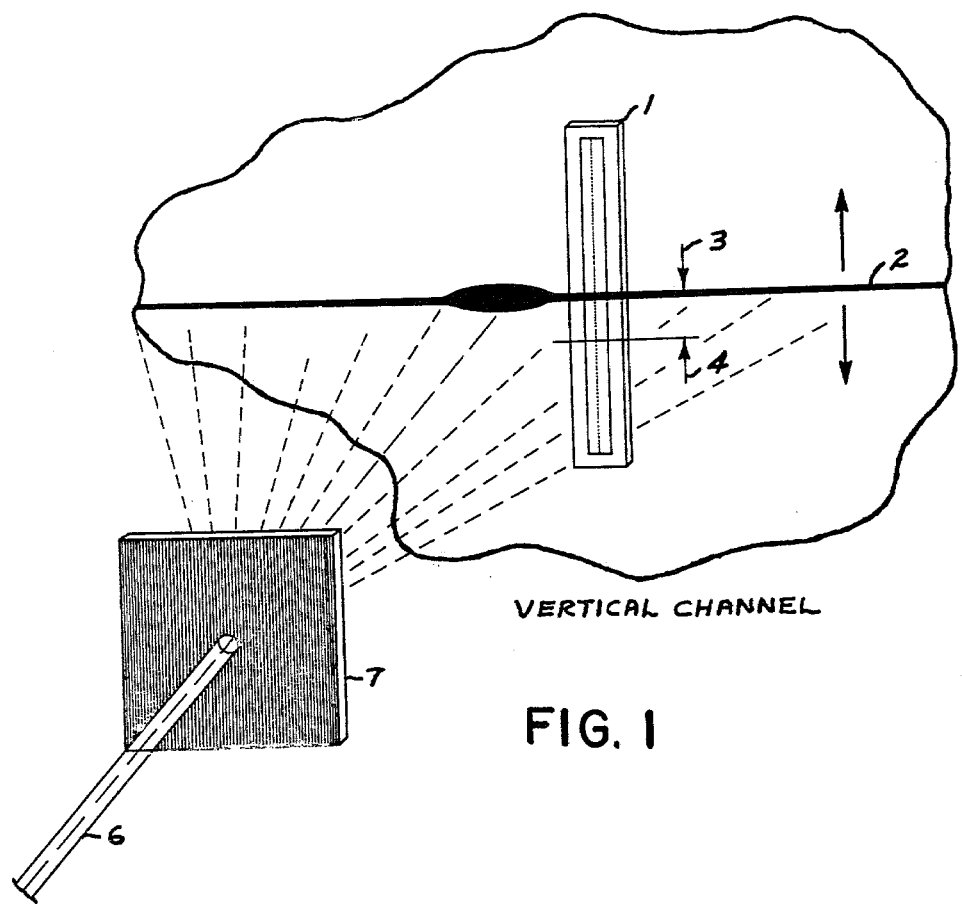
FIG. 1 schematically depicts one application for the embodying electronic apparatus.

With an awareness of these underlying conventions, attention is directed to FIG. 1 of the drawings. Though the central feature of the invention lies in the apparatus performing the electronic processing of array data, it is useful to understand the overall context in which the apparatus is employed. As depicted in this embodiment, the aforementioned array, 1, is oriented perpendicular to luminous energy fan line 2. The optical apparatus creating and directing fan line 2 translates it in the direction of the array axis, in such a way that the distance between its present shown location, 3, and reference line 4 corresponds by a known function to the parameter being measured.

It is worth noting that fan line 2 is the Fraunhofer diffraction pattern of laser beam 6 when this beam is projected through random diffraction grating 7. The import of its formation lies in the fact that fan line 2 has a measurable width at the intersection with array 1, which width simultaneously illuminates a number of photodiodes in the array. In general, it may be said that the envelope of the intensity across fan line 2 approaches a Gaussian curve.

Figure 2:
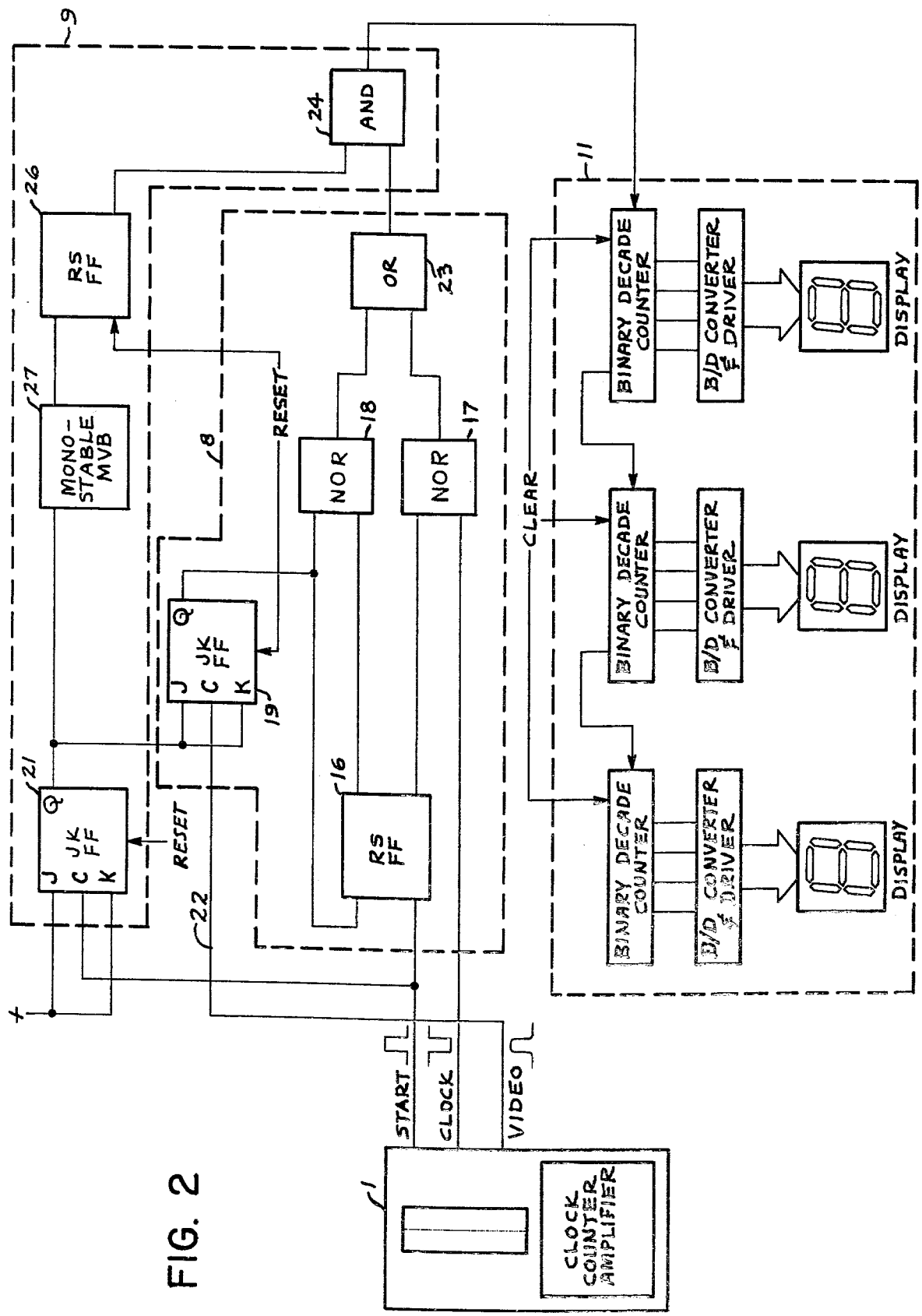
FIG. 2 is an electrical schematic block diagram of an embodiment.

Attention is now directed to FIG. 2 where the invention is preferably embodied in an electronic circuit. In fabrication the circuit utilizes conventional TTL logic gates and a 512 element G-series linear photodiode array manufactured by EG & G Reticon. Array 1, as packaged, contains an RC 300 series clock, counter and amplifier circuit. The clock rate is set to a frequency of approximately 250 KHz. The cell-to-cell sampling rate is fixed to the clock frequency while the total time between full array scans is approximately one five-hundredth of the clock rate.

Three electrical signals eminating from array 1 convey all the data of interest. A start pulse appears whenever a new scan of the array is commenced, its repetition rate corresponding to the full array scan rate. The clock is free-running, driving a counter internal to the array which defines the order the elements are sampled. Since the video output is synchronized to the clock pulses, at all counts from the start pulse, the video signal at each clock pulse along the train of pulses represents the photodiode response at a specific location along the length of the array.

In the overview, the circuits shown and described with particularity hereinafter accumulate the clock count between commencement of an array scan and the first detection of a photometric response in an array element. Thereafter, the counter receives every second detected video response as a count pulse until the scan is completed. Once a video response is detected, and alternate responses are counted, clock pulses are no longer routed to the counter. Furthermore, upon the commencement of the succeeding scan, evidenced by the start pulse, the circuit locks out all counter directed pulses until all the control circuitry is cleared and reset by a supplemental timing circuit. The counter thus contains a count representing the center location of the fan line 2, notwithstanding the fact that the fan line actually illuminates a number of photodiode elements simultaneously. Once calibrated, the embodying apparatus, when joined with a conventional counter, digitally depicts the fan line crossing with a nominal accuracy of ±1 in the least significant digit.

Continuing, the general operation of the apparatus also overcomes the normal flicker in the least significant digit by performing a short duration sampled measurement followed by a long duration fixed display of the measured quantity, cycled at a low frequency in comparison to the rate of human visual response.

For purposes of clarity, the preferred embodiment is divided into functional groups enclosed by dashed lines 8, 9 and 11. Though shown separately in FIG. 3, the sampling rate circuitry, generating the clear and reset commands, is an inherent part of the overall apparatus. Functional groups 8 and 9 contain the logic defining when pulses are routed to conventional binary counter and decimal display group 11.

Figure 3:
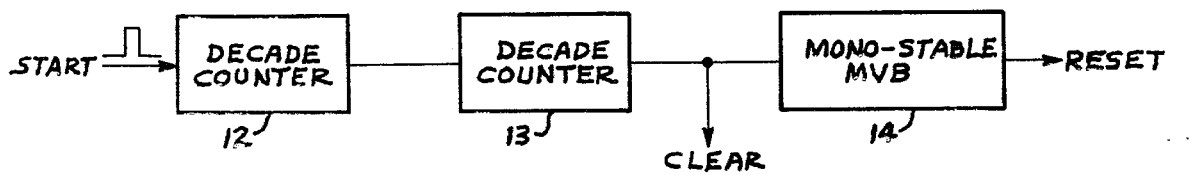
FIG. 3 contains an electrical schematic of the sampling rate control.

The sampling rate group in FIG. 3 is a logical starting point for describing the overall apparatus since it defines the visual display's rate-of-change and perceived appearance. Series connected decade counters 12 and 13 generate a clear command and a short duration reset pulse for every 100 start pulses. Recalling that the start pulse rate is approximately 500 Hz, the sampling rate prescribed by counters 12 and 13 is then approximately five times per second. Though the reset and clear commands are shown in FIG. 3 to be separated by monostable multivibrator 14 they are, in general, coextensive in function. Their distinction lies in the fact that the short reset pulse generated in multivibrator 14 completes its cycle before the onset of the start pulse, while the pulse duration of the clear pulse from counter 13 extends to a temporal overlap with the start pulse. The temporal relationship of the various pulse commands will be clear when the timing sequence, plotted in FIGS. 4a–4f, is described hereinafter.

Returning to FIG. 2, the next functional group to be described is designated by reference numeral 8. In this analysis, it should be noted that NOR gates 17 and 18 perform an AND function, in that the output is high in response to *coincidence* of both inputs being low. In defining the operating sequence, the states of the logic devices shall commence at a point in time preceeding the start pulse, and immediately after the clear command zeros counter group 11 and the reset pulse ceases. Reference to the timing sequence shown in FIG. 4 may be helpful. At this point in time RS flip-flop 16 provides a high logic input state to NOR gate 17 and a low logic input state to NOR gate 18. By action of the reset pulse, JK flip-flop 19 has a low logic output state and a low logic input state as defined by JK flip-flop 21. The relevance of these last noted inputs lies in their control of the output state when a clock pulse command appears on input line 22. Only when the two inputs originating in JK flip-flop 21 are in a high logic state will a pulse on lead 22 to the clock input reverse the output of flip-flop 19. Undoubtedly one recognizes the logic function of OR gate 23.

Upon the appearance of the start pulse, RS flip-flop 16 is reversed, providing a low state to the input of NOR gate 17 and a high state to that of NOR gate 18. Low state clock signals are thereafter transmitted through gates 17 and 23. The same start pulse reverses JK flip-flop 21, placing JK flip-flop 19 in preparedness for a clocking signal on line 22. The clock pulses passing through NOR gate 17, (inverted to high level) OR gate 23 and AND gate 24 enter counter group 11 for accumulation. The manner in which the other input to AND gate 24 is appropriately set will be described with particularity hereinafter.

Counter group 11 accumulates the clock pulses in conventional manner until a video signal clocking pulse 26C above a threshold value appears on line 22 of JK flip-flop 19. With the inputs to JK flip-flop 19, from flip-flop 21, in a high state, flip-flop 19 reverses its output to a high logic level. Immediately thereupon RS flip-flop 16 is reversed so that a high input state is provided to NOR gate 17 and a low input state is provided to NOR gate 18. NAND gate 17 is effectively disabled, while gate 18 generates an output only when its input, the output of JK flip-flop 19, is in a low state. Upon the appearance of the second video pulse 26D above the threshold, and every second one thereafter, a logic signal is transmitted through the successive gates to counter group 11. This is because the video pulses on lead 22 trigger flip-flop 19 low on one pulse and high on the next, to thereby operate as a divide-by-two circuit for the video pulses. Thus, it may be said that the count accumulated and displayed contains the clock pulses until a video pulse above the threshold is generated, and thereafter only half the video pulses above the threshold.

Now consider the function of the logic group enclosed by dashed line 9. Recalling that a start pulse is generated for each scan of the photodiode array, in conjunction with the one in a hundred scans sampling technique chosen for purposes of display stability, the function of this group is brought into perspective. The group prevents the reinitiation of counts coincident with subsequent scan start pulses until 99 additional scans of the complete linear array have been completed.

As was the case in explaining the previous functional group, it is useful to commence the sequence immediately following the termination of the reset pulse. JK flip-flop 21 has a low logic level output state, while RS flip-flop 26 has a high output state, so that signals from OR gate 23 pass through AND gate 24. Mono-stable multivibrator 27 is negative edge triggered, generating an output pulse only when JK flip-flop 21 transitions from a high to a low state. Since the reset command initiates such a transition, and RS flip-flop 26 must be in the reset state at the termination of the reset pulse, the duration of the pulse generated by mono-stable multivibrator 27 must be measurably shorter than the reset pulse.

Upon the appearance of the start pulse, after reset, JK flip-flop 21 reverses to a high level output state. Mono-stable multivibrator 27, being negative edge triggered, generates no pulse to alter RS flip-flop 26. As the photodiode scan proceeds, the states of elements in logic group 8 change as described above. The situation is different, however, upon the onset of the next succeeding scan, in that the start pulse reverses JK flip-flop 21 from a high to a low state, actuates mono-stable multivibrator 27, reverses RS flip-flop 26 and provides a low logic input state to AND gate 24. Thereafter, count pulses, whether clock or video originated, are unable to pass through AND gate 24 until the next clear and reset sequence.

Summarizing, then, after a clear and reset have occured, clock pulses are accumulated in a counter 11 until the array scan detects a video pulse. Thereafter, the counter 11 receives every second video pulse, with all subsequent clock pulses being locked out. Upon the onset of the succeeding scan all count pulses are prevented from reaching the counter. The counter accumulates the count during one scan of the array and displays the sum for the next 99 scans, cyclically repeating ad infinitum. Since the clock pulses represent precise increments of position along the photodiode array, and the counter receives one half the count over the region illuminated by the fan line, the accumulation in the counter is an accurate location of the fan line center along the photodiode array.

The timing sequences depicted in FIGS. 4a–4f are helpful in organizing the temporal relationships of the important pulses. For the embodying device the clock signal corresponds to the low state. Note the completion of the reset pulse prior to the onset of the start pulse, and the slight delay of the start pulse after the preceeding clock pulse. The count pulses plotted in FIG. 4d corresponds to the signals leaving AND gate 24. The plot shows that after the last video pulse above the threshold the output of gate 24 remains high (if there were an odd number of video pulses above the threshold this would be low); but since counters only respond to transitions in a given direction, the steady state condition does not advance the count.

FIG. 4c is useful in understanding, with greater specificity, the characteristics of the video pulses. Plot 26 is an envelope of the individual photodiode responses in the region of the fan line, and to a great extent reproduces the Gaussion character of the fan line. By appropriate amplification and selection of JK flip-flop 19, only video signals exceeding threshold level 27 are sufficient to trigger the reversal of the flip-flop. Alternate threshold triggered circuits are undoubtedly well known. A comparison of FIGS. 4b through 4d shows the temporal relationship of the count generating pulses. To further clarify the operation, the pulses in envelope 26 are designated 26A–26H. Pulses 26A and 26B are below the threshold and have no effect. Pulse 26C is effective to trigger flip-flop 19 to the high level output, which triggers flip-flop 16 to enable gate 18 and disable gate 17. Pulses 26C and 26E at their positive going transitions respectively trigger flip-flop 19 low and high, to generate one pulse through gate 18. Pulse 26F triggers flip-flop 19 to the low output level so that the output of gate 18 goes high. Pulses 26G and 26H are below the threshold and have no effect, and therefore the output via gates 18, 23 and 24 remains high until the next start pulse.

Figure 5:
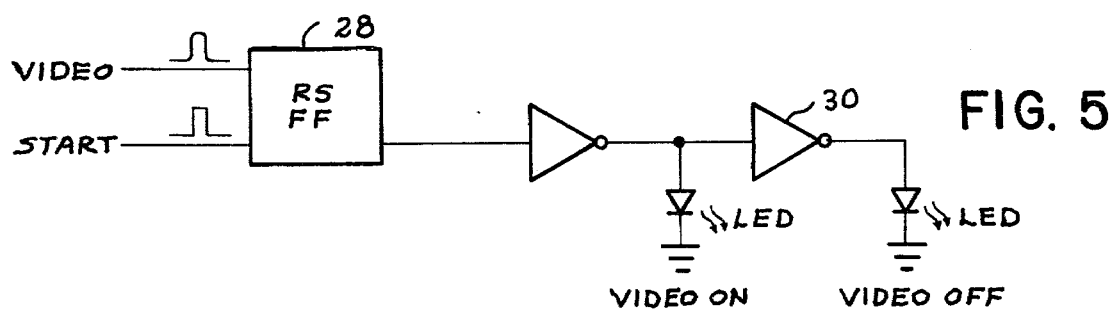
FIG. 5 has an electrical schematic of a video signal presence monitor circuit.

To avoid the display and use of erroneous counts, the start and video pulses are monitored by RS flip-flop 28, as shown in FIG. 5. The illumination of both light emitting diodes (LED'S), as perceived by the human operator, indicates that the array is receiving and transmitting video signals. The operation of either one singly, indicates a malfunction and a meaningless value on the counter display. Because of the inverter between them, one LED is on and the other off at any instant. However, if start and video pulses occur every scan cycle, the persistence of vision make both appear to be illuminated.

I claim:

1. An apparatus for digitally locating the centrum of a luminous energy beam, comprising:
   a shift register scanned linear photodetector array generating a luminous energy actuated video output signal;
   a shift register clock generating pulses in correspondence to the sampling of array elements;
   a means for generating a start signal at the beginning of each array scan;
   a means for counting pulses;
   a means for transmitting clock pulses to the counting means;
   a flip-flop having a clock input connected to receive said video output signal and to trigger the flip-flop to change state only when the video output exceeds a given threshold value, so that it operates as a divide-by-two means;
   means connected to be triggered in response to the first change of state of said flip-flop during a scan to stop said transmission of clock pulses and to start the transmission of pulses output from the flip-flop to the counting means until the next succeeding start signal.

2. The apparatus recited in claim 1, further containing a means for periodically resetting the logic and clearing the counter, in synchronism with, but at a much lower repetition rate than, the start signals.

3. The apparatus recited in claims 1 or 2, further containing a pair of visual display elements, operable in the alternate and in synchronism with the start signal and the first video output signal.

4. An electronic device for locating the centrum of a luminous energy beam, comprising:
   photodetector means including a serially scanned linear photodetector array of elements generating a luminous energy actuated series of "video" pulses whose amplitudes are functions of the light intensity on corresponding array elements, with the "video" pulses appearing on a "video" lead, generating clock pulses on a clock lead in correspondence to the sampling of array elements, and generating a start signal on a start lead at the beginning of each array scan;
   a first flip-flop having a clock input connected to said "video" lead and enabled so that only "video" pulses exceeding a given threshold level change the state of the flip-flop at an output thereof, whereby said first flip-flop acts as a divide-by-two means for "video" pulses which exceed said threshold level;
   a second flip-flop having a first input connected to said start lead, and a second input connected to the output of the first flip-flop, the second flip-flop being responsive to a start signal at its first input to set it to a first state and a pulse at its second input to set it to a second state, the second flip-flop having output means connected to first and second AND function gates so that in said first state the first AND function gate is enabled while the second is disabled, and in said second state the second AND function gate is enabled while the first is disabled, the first AND function gate having a second input connected to said clock lead, and the second AND function gate having a second input connected to the output of the first flip-flop;
   a counter coupled to outputs of said first and second AND function gates to count pulses transmitted via the second input of the one which is enabled; whereby in one scan cycle commencing with a start pulse, clock pulses transmitted via the clock lead and the first AND function gate are counted until a "video" pulse on the "video" lead exceeds said threshold, and then alternate "video" pulses exceeding the threshold are counted, after which there is no further advance of the counter for the remainder of the scan cycle.

5. The apparatus as set forth in claim 4, wherein the coupling between said first and second AND function gates and the counter includes an OR function gate.

6. The apparatus as set forth in claim 5, further including an antiflicker circuit comprising third and fourth flip-flops, each having first and second states, a monostable multivibrator connected between the third and fourth flip-flops, and a third AND function gate;
   an auxiliary counter having an input connected to said start lead and output means connected to a clear lead and a reset lead, to count start pulses for a given number of scan cycles and then generate a pulse on the clear lead and a shorter pulse on the reset lead, the reset lead being connected to reset inputs of said first, third and fourth flip-flops to reset them, the clear lead being connected to the first said counter to clear it to zero;

the third AND function gate having one input connected to an output of the fourth flip-flop and a second input connected to the output of said OR function gate, and its output connected to the first said counter to form part of the coupling between said first and second AND function gates and the first said counter;

wherein said third flip-flop has a clock input connected to said start lead and an output connected to input means of said flip-flop and also to said multivibrator, the circuit being operative so that immediately following termination of the reset pulse the third and fourth flip-flops are in the second and first states respectively, so that signals from said OR function gate pass through the third AND function gate;

the start pulse of a first scan cycle following said reset being effective to change the third flip-flop to its first state, which enables the first flip-flop, with the fourth flip-flop remaining in its first state, the start pulse of a second scan cycle being effective to reverse the state of the third flip-flop, the transition of the third flip-flop from its first to second states being effective to trigger the monostable multivibrator, which in turn changes the fourth flip-flop to its second state, which disables the third AND function gate, to thereby stop all pulses from being transmitted to the first said counter until the auxiliary counter next generates pulses on the clear and reset leads;

display means connected to the first said counter to display its contents, whereby the first said counter accumulates a count during one scan of the array, and the sum is displayed for the next given number of scan cycles.

* * * * *

UNITED STATES PATENT AND TRADEMARK OFFICE
CERTIFICATE OF CORRECTION

PATENT NO. : 4,309,106
DATED : January 5, 1982
INVENTOR(S) : Kenneth L. Smith

It is certified that error appears in the above-identified patent and that said Letters Patent are hereby corrected as shown below:

In the title, correct the spelling of ---LOCATOR---.

Col, 5, line 31 change "26C" to ---26D---.

Signed and Sealed this

Eighteenth Day of May 1982

[SEAL]

Attest:

Attesting Officer

GERALD J. MOSSINGHOFF
Commissioner of Patents and Trademarks